US010942975B2

(12) United States Patent
Friel et al.

(10) Patent No.: US 10,942,975 B2
(45) Date of Patent: Mar. 9, 2021

(54) SEARCH ENGINE FOR SENSORS (71) Applicant: Cisco Technology, Inc., San Jose, CA (US)

(72) Inventors: Joseph T. Friel, Ardmore, PA (US); Hugo Mike Latapie, Long Beach, CA (US); Andre Jean-Marie Surcouf, St Leu la Foret (FR); Enzo Fenoglio, Issy-les-Moulineaux (FR); Pete Rai, Surrey (GB)

(73) Assignee: Cisco Technology, Inc., San Jose, CA (US)

(*) Notice: Subject to any disclaimer, the term of this patent is extended or adjusted under 35 U.S.C. 154(b) by 967 days.

(21) Appl. No.: 15/160,588

(22) Filed: May 20, 2016

(65) Prior Publication Data
US 2017/0337285 A1 Nov. 23, 2017

(51) Int. Cl.
*G06F 16/951* (2019.01)
(52) U.S. Cl.
CPC .................. *G06F 16/951* (2019.01)
(58) Field of Classification Search
CPC ....................................................... G06F 16/951
USPC ........................................................ 707/706
See application file for complete search history.

(56) References Cited

U.S. PATENT DOCUMENTS

| 8,427,309 B2* | 4/2013 | Bullard | H04W 4/38 340/540 |
| 2006/0267756 A1* | 11/2006 | Kates | H04B 1/69 340/521 |
| 2009/0015403 A1* | 1/2009 | Kuris | G16H 40/40 340/540 |
| 2011/0012603 A1* | 1/2011 | Bose | G06F 16/24568 324/418 |
| 2011/0147135 A1* | 6/2011 | Birrer | B66B 5/06 187/393 |
| 2013/0216989 A1* | 8/2013 | Cuthbert | A61B 5/721 434/238 |
| 2013/0218816 A1* | 8/2013 | Yu | G06N 20/00 706/12 |
| 2013/0249521 A1* | 9/2013 | Cheng | G06F 1/3287 323/304 |
| 2013/0256515 A1* | 10/2013 | Crook | G01D 3/022 250/216 |

(Continued)

*Primary Examiner* — Usmaan Saeed
*Assistant Examiner* — David M Nafziger
(74) *Attorney, Agent, or Firm* — Behmke Innovation Group LLC; James M. Behmke; Jonathon P. Western (57) ABSTRACT

Various implementations disclosed herein provide a search engine that receives a search request from a sensor gateway, and provides search results in return. In various implementations, the search request includes a first set of measurements captured by a first sensor, a first measurement from the first set of measurements is outside a defined range. In various implementations, the search engine determines a first feature vector based on the first set of measurements, and identifies a second feature vector that indicates a second set of measurements within a degree of similarity to the first set of measurements. In some implementations, the second set of measurements are captured by a second sensor. In various implementations, the search engine determines a search result based on the second feature vector, and transmits the search result. In some implementations, the search result indicates one or more instructions executable by the first sensor.

17 Claims, 6 Drawing Sheets

(56) References Cited

U.S. PATENT DOCUMENTS

| | | | |
|---|---|---|---|
| 2014/0025337 A1* | 1/2014 | Blount | G06F 9/45558 702/183 |
| 2014/0046539 A1* | 2/2014 | Wijffels | B60T 8/1755 701/36 |
| 2014/0171118 A1* | 6/2014 | Marti | H04W 4/021 455/456.3 |
| 2014/0365194 A1* | 12/2014 | O'Hagan | A41D 1/002 703/11 |
| 2015/0080011 A1* | 3/2015 | Zelinka | H04W 4/029 455/456.1 |
| 2015/0088923 A1* | 3/2015 | Garcia-Barrio | G06F 16/583 707/769 |
| 2015/0112996 A1* | 4/2015 | Mishra | G06F 16/134 707/741 |
| 2015/0207908 A1* | 7/2015 | Hosoda | G06F 1/1626 455/566 |
| 2015/0253368 A1* | 9/2015 | Ochs | G01R 35/00 324/503 |
| 2015/0334768 A1* | 11/2015 | Ranasinghe | H04W 40/248 370/328 |
| 2015/0362408 A1* | 12/2015 | Rosendo | G05B 23/0221 702/104 |
| 2016/0087976 A1* | 3/2016 | Kaplan | H04L 63/126 713/156 |
| 2016/0162519 A1* | 6/2016 | Stowe | G06F 16/284 707/755 |
| 2016/0212694 A1* | 7/2016 | Lindoff | H04W 48/18 |
| 2016/0241445 A1* | 8/2016 | Kim | H04L 12/6418 |
| 2016/0267774 A1* | 9/2016 | Janardhanan | G08B 25/008 |
| 2016/0283443 A1* | 9/2016 | Michalscheck | F16K 37/0025 |
| 2016/0285717 A1* | 9/2016 | Kim | H04L 12/2803 |
| 2016/0342840 A1* | 11/2016 | Mullins | G02B 27/0172 |
| 2016/0350416 A1* | 12/2016 | Ishii | G06K 9/6223 |
| 2016/0371588 A1* | 12/2016 | Richardson | G06Q 10/04 |
| 2016/0378584 A1* | 12/2016 | Oku | G06F 11/079 358/1.14 |
| 2017/0017214 A1* | 1/2017 | O'Keeffe | G06N 20/00 |
| 2017/0039229 A1* | 2/2017 | Verma | G06F 16/22 |
| 2017/0046382 A1* | 2/2017 | Li | G06F 16/2264 |
| 2017/0124785 A1* | 5/2017 | Rozak | G06F 30/20 |
| 2017/0168464 A1* | 6/2017 | Dabrowski | G08B 13/19634 |
| 2017/0188178 A1* | 6/2017 | Vrabete | H04W 4/70 |
| 2017/0226842 A1* | 8/2017 | Omont | E21B 44/005 |
| 2017/0289738 A1* | 10/2017 | Jepson | A61B 5/7221 |
| 2018/0011536 A1* | 1/2018 | Kim | G06F 3/017 |
| 2018/0097886 A1* | 4/2018 | Inoue | H04L 67/12 |
| 2018/0157552 A1* | 6/2018 | Kaur | G06F 16/2365 |
| 2018/0197393 A1* | 7/2018 | Gallo | G06F 3/04847 |
| 2018/0216960 A1* | 8/2018 | Doshi | G01D 18/008 |
| 2019/0138423 A1* | 5/2019 | Agerstam | G06N 3/0445 |

\* cited by examiner

SEARCH ENGINE FOR SENSORS

TECHNICAL FIELD

The present disclosure generally relates to search engines, and in particular, to a search engine for sensors.

BACKGROUND

Search engines facilitate the dissemination of information. Previously available search engines provide a graphical user interface (GUI) to a user in order to receive a search query from the user. Most search engines display the GUI via a website. Typically, users use a web browser to navigate to the website, and enter their search query in a search box that is displayed on the website. Some search engines display the GUI through an application that is installed on a computing device. For example, the operators of some previously available search engines provide a search application that the user can download from an application store. Once the search application is downloaded and installed at a computing device, a user enters a search query in a search box displayed by the application.

Upon receiving a search query, previously available search engines provide search results that are typically relevant to the search query. Typically, the search results include links to various web sites. If a user selects one of the links, then a website corresponding to the link is launched and displayed. Some previously available search engines provide links for various applications. If a user selects a link for an application, then the corresponding application is launched. If the application is not installed, then some previously available search engines direct the user to the application store where the application is available for download.

In order to provide the search results, some previously available search engines crawl and scrape numerous web sites in advance. Most previously available search engines utilize scrapers that rely on metatags to extract relevant information from a web page. The search engines typically store the scraped content in a database, and later utilize the database to generate the search results. Some previously available search engines also store the search queries that they receive. While many users find such previously available search engines to be useful, it is difficult for most sensors to utilize such search engines. Hence, many sensors do not benefit from previously available search engines.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein enable providing search results to a sensor gateway in response to receiving a search query from the sensor gateway. For example, in various implementations, a method of determining a search result is performed by a search engine that is configured to provide search results in response to receiving search requests. In various implementations, the search engine includes one or more processors. In various implementations, the method includes receiving a search request from a sensor gateway. In some implementations, the search request includes a first set of measurements captured by a first sensor. In some implementations, a first measurement from the first set of measurements is outside a defined range. In various implementations, the method includes determining a first feature vector based on the first set of measurements. In various implementations, the method includes identifying a second feature vector that indicates a second set of measurements within a degree of similarity to the first set of measurements. In some implementations, the second set of measurements are captured by a second sensor. In various implementations, the method includes determining a search result based on the second feature vector. In some implementations, the search result indicates one or more instructions executable by the first sensor. In various implementations, the method includes transmitting the search result to the sensor gateway.

Figure 1:
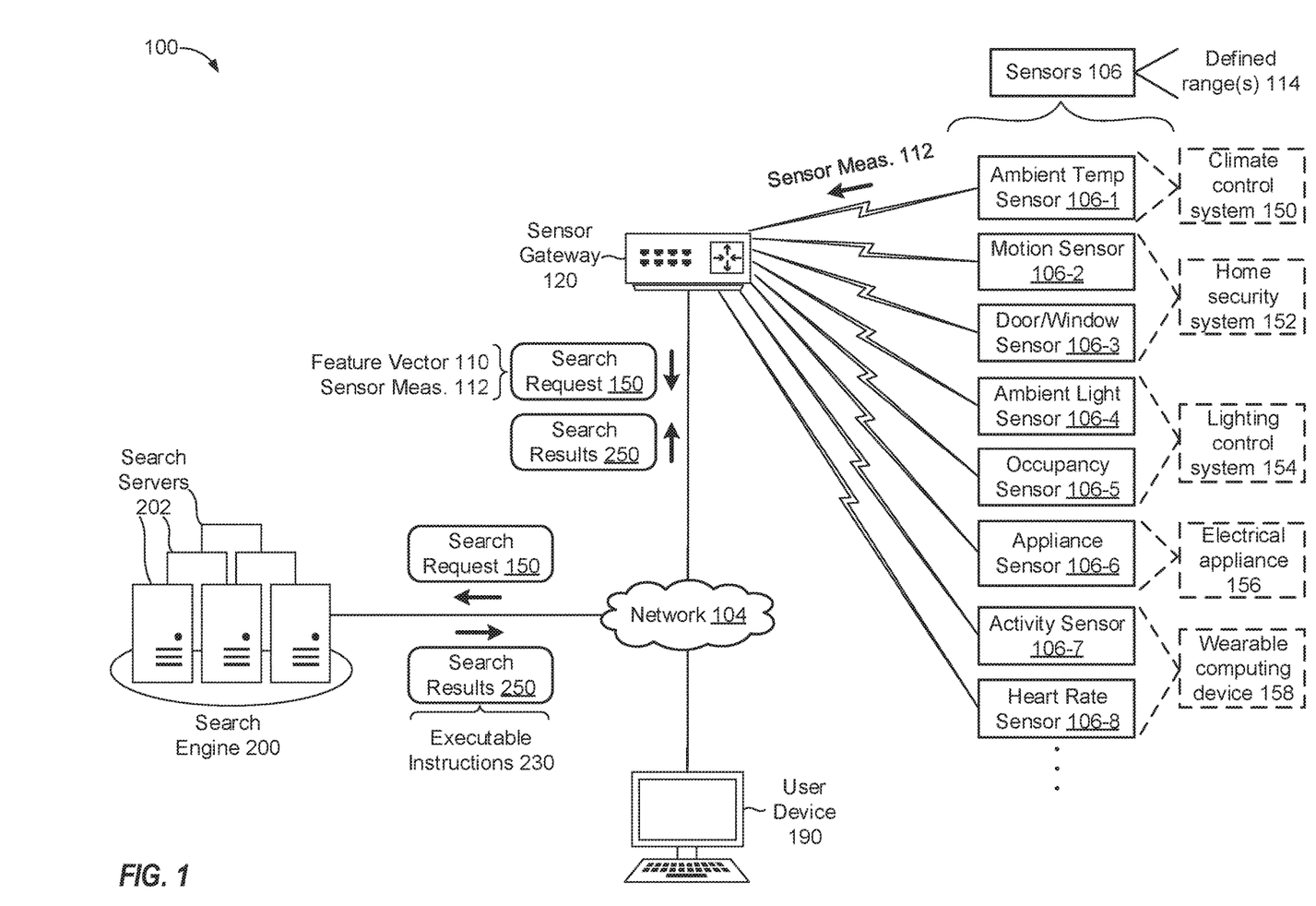
FIG. 1 is a schematic diagram of a search engine environment in accordance with some implementations.

FIG. 1 is a block diagram of a search engine environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the search engine environment 100 includes a public/external network 104 (e.g., a portion of the Internet), one or more sensors 106, a sensor gateway 120, a user device 190 and a search engine 200.

In various implementations, the sensors 106 include devices that detect events or changes in their environment, and output sensor measurements 112. The sensors 106 include a variety of sensors. For example, in some implementations, the sensors 106 include an ambient temperature sensor 106-1, a motion sensor 106-2, a door/window sensor 106-3, an ambient light sensor 106-4, an occupancy sensor 106-5, an appliance status sensor 106-6, an activity sensor 106-7, a heart rate sensor 106-8, etc. In some implementations, the sensors 106 are part of another system, an appliance, or a device. For example, in some implementations, the ambient temperature sensor 106-1 is part of a climate control system 150. In some implementations, the motion sensor 106-2 and the door/window sensor 106-3 are part of a home security system 152. In some implementations, the ambient light sensor 106-4 and the occupancy sensor 106-5 are part of a lighting control system 154. In some implementations, the appliance status sensor 106-6 is part of an electrical appliance 156. In some implementations, the activity sensor 106-7 and the heart rate sensor 106-8 are part of a wearable computing device 158.

In various implementations, the sensor measurements 112 include data that is captured by the sensors 106. In some implementations, the sensor measurements 112 include numeric values. For example, a sensor measurement 112 captured by the ambient temperature sensor 106-1 includes a numeric value that indicates an ambient temperature (e.g., 67° F.). Similarly, a sensor measurement 112 captured by the heart rate sensor 106-8 includes a numeric value that indicates a heart rate (e.g., 72 bpm). In some implementations, the sensor measurements 112 include text strings. For example, in some implementations, a sensor measurement 112 captured by the appliance status sensor 106-6 includes a text string that indicates whether the electrical appliance 156 is "ON" or "OFF". In some implementations, the sensor measurements 112 include images, videos, and/or audio. For example, in some implementations, the sensors 106 include a camera (e.g., as part of the home security system 152) that captures images, videos, and/or audio.

In various implementations, the sensors 106 send (e.g., transmit) the sensor measurements 112 to the sensor gateway 120. In some implementations, the sensors 106 send the sensor measurements 112 to the sensor gateway 120 via short-range wireless communications (e.g., Wi-Fi, Bluetooth, NFC, ZigBee, etc.). In some implementations, the sensors 106 send the sensor measurements 112 to the sensor gateway 120 via wired communications (e.g., Ethernet, USB, etc.). In some implementations, the sensors 106 send the sensor measurements 112 to the sensor gateway 120 upon (e.g., immediately upon) capturing the sensor measurements 112. Alternatively, in some implementations, the sensors 106 send the sensor measurements 112 to the sensor gateway 120 periodically (e.g., every 24 hours, every 7 days, etc.).

In various implementations, the sensors 106 send the sensor measurements 112 to the sensor gateway 120 when the sensor measurements 112 are anomalous. In some implementations, a sensor measurement 112 is anomalous, if the sensor measurement 112 is outside a define range 114. For example, in some implementations, a sensor 106 sends a sensor measurement 112 to the sensor gateway 120, if (e.g., only if) the sensor measurement 112 is outside the defined range 114. In such implementations, the sensor 106 determines whether the sensor measurement 112 is within the defined range 114, and sends the sensor measurement 112 to the sensor gateway 120 upon determining that the sensor measurement 112 is outside the defined range 114. In some implementations, each sensor 106 stores a defined range 114. For example, the ambient temperature sensor 106-1 stores a defined range 114 that includes a range of temperatures. Similarly, in some implementations, the heart rate sensor 106-8 stores a defined range 114 that includes a range of heart rates. In some implementations, a sensor 106 receives its corresponding defined range 114 from the user device 190 and/or the search engine 200. In some implementations, a sensor 106 stores a default range of values that represent the defined range 114. In some implementations, the defined range 114 is configurable, for example, based on data received from the search engine 200 and/or the user device 190.

In various implementations, the sensor gateway 120 sends a search request 150 to the search engine 200. The search request 150 includes the sensor measurements 112 that the sensor gateway 120 receives from the sensors 106. In some implementations, the sensor gateway 120 instantiates a data container (e.g., a JSON object) that represents the search request 150. In such implementations, the sensor gateway 120 writes the sensor measurements 112 to the data container, and transmits the data container to the search engine 200. In the example of FIG. 1, the sensor gateway 120 is shown as being separate from the sensors 106. However, in some implementations, the sensor gateway 120 is part of the sensors 106. For example, in some implementations, a sensor 106 sends the search request 150 directly to the search engine 200.

In some implementations, the search request 150 includes a feature vector 110. In various implementations, the feature vector 110 is a vector of numerical features. In some implementations, the feature vector 110 includes a set of sensor measurements 112 as its features. In some implementations, the feature vector 110 includes any contextual information that is useful to the search engine 200 in determining the search results 250. In some implementations, the sensors 106 and/or the sensor gateway 120 convert a set of sensor measurements 112 into the feature vector 110. In some implementations, the search request 150 includes the feature vector 110 instead of the sensor measurements 112. Alternatively, in some implementations, the search request 150 includes the feature vector 110 in addition to the sensor measurements 112.

In various implementations, the search engine 200 receives the search request 150, and provides search results 250 in response to receiving the search request 150. In some implementations, the search results 250 include executable instructions 230 for a sensor 106. As described in relation to FIG. 2, in some implementations, the executable instructions 230 include operations for the sensor 106 to perform. In other words, in some implementations, the executable instructions 230 include actions that a sensor 106 can perform. For example, in some implementations, the executable instructions 230 instruct the sensor 106 to continue operating (e.g., when the search engine 200 determines that the sensor measurement 112 is not anomalous). In some implementations, the executable instructions 230 instruct the sensor 106 to reboot or to shutdown (e.g., when the search engine 200 determines that the sensor measurement 112 is anomalous). In some implementations, the executable instructions 230 instruct the sensor 106 to modify the defined range 114 to incorporate the sensor measurement 112 that the sensor 106 identified as anomalous. In various implementations, the search engine 200 includes one or more search servers 202 that process the search request 150 and synthesize the search results 250.

In various implementations, the user device 190 enables a user (e.g., a human operator) to access the search engine 200. In some implementations, the user device 190 displays a graphical user interface (GUI) for accessing the search engine 200. The user device 190 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, the user device 190 includes one or more processors, one or more types of memory, a display and/or other user interface components such as a keyboard, a touch screen display, a mouse, a track-pad, a digital camera and/or any number of supplemental devices to add functionality. In some implementations, the user device 190 includes a suitable combination of hardware, software and firmware configured to provide at least some of protocol processing, modulation, demodulation, data buffering, power control, routing, switching, clock recovery, amplification, decoding, and error control.

Figure 2:
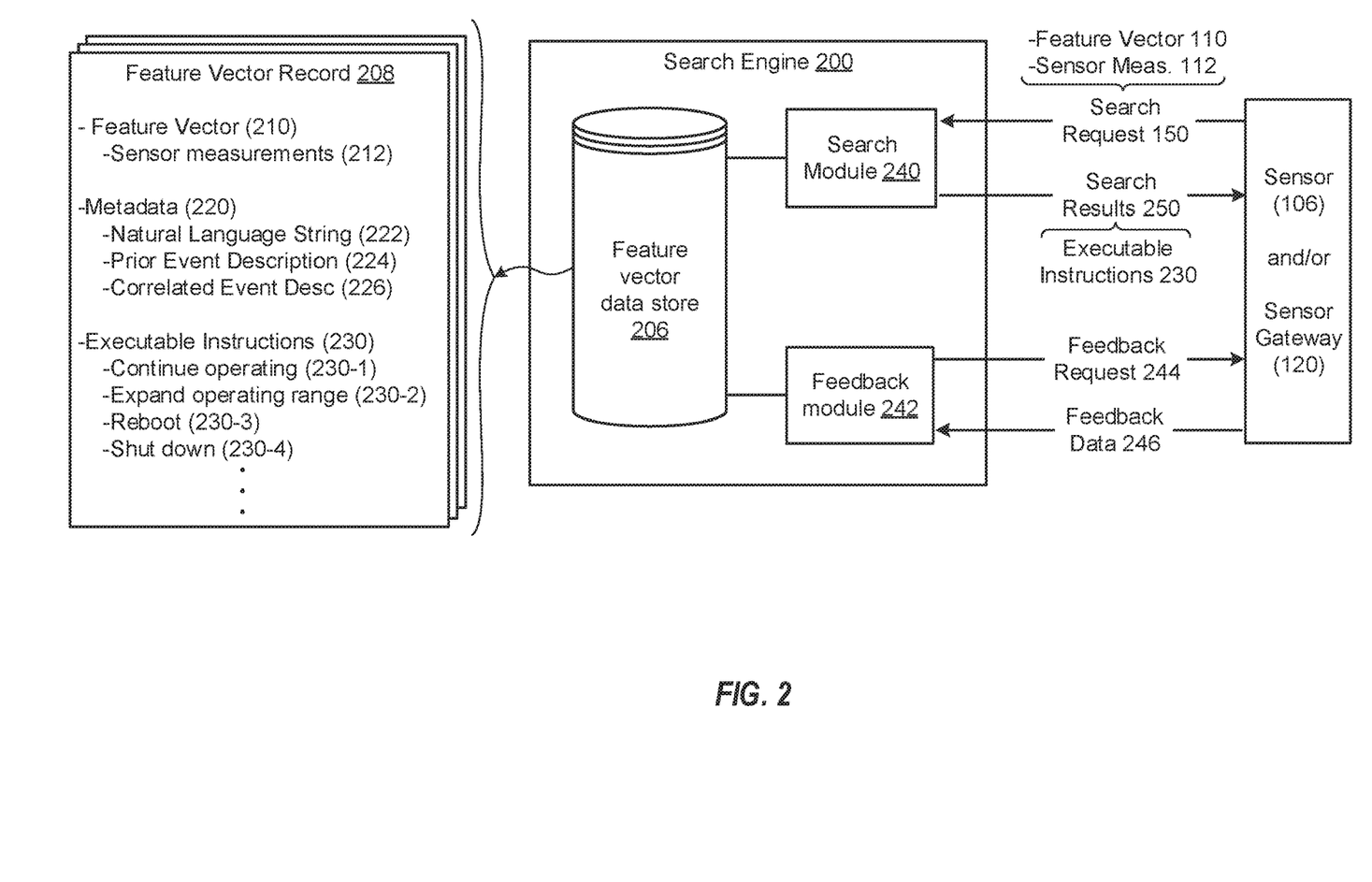
FIG. 2 is a block diagram of a search engine in accordance with some implementations.

FIG. 2 is a block diagram of the search engine 200 in accordance with some implementations. In various implementations, the search engine 200 includes a feature vector data store 206 (data store 206, hereinafter), a search module 240, and a feedback module 242. In various implementations, the search engine 200 includes one or more data storage devices that store the data store 206, and computer readable instructions corresponding with the search module 240 and the feedback module 242. In various implementations, the search engine 200 includes one or more computing devices that execute the computer readable instructions corresponding with the search module 240 and the feedback module 242.

In operation, in various implementations, the search module 240 utilizes the data store 206 to determine the search results 250 in response to receiving the search request 150. In some implementations, the feedback module 242 sends a feedback request 244, and receives feedback data 246 in response to sending the feedback request 244. In some implementations, the feedback module 242 utilizes the feedback data 246 to update the data store 206. In some implementations, updating the data store 206 based on the feedback data 246 tends to improve the relevance of the search results 250.

In various implementations, the data store 206 stores feature vector records 208 (records 208, hereinafter) that correspond with respective feature vectors 210. In some implementations, each record 208 stores its corresponding feature vector 210, metadata 220, and one or more executable instructions 230. As used herein, in various implementations, a feature vector 210 is a vector of numerical features. In some implementations, each feature vector 210 includes a set of sensor measurements 212 as its features. In some implementations, the sensor measurements 212 in a feature vector 210 represent data that was previously captured by one or more sensors.

In various implementations, the metadata 220 indicates the context that resulted in the sensor measurements 212. In other words, in some implementations, the metadata 220 indicates an event that resulted in the sensor measurements 212. To that end, in some implementations, the metadata 220 includes a natural language string 222, a prior event description 224, and/or a correlated event description 226. In some implementations, the natural language string 222 includes a text string that a human operator provided when the sensor measurements 212 were captured. In some implementations, the prior event description 224 describes an event that is associated with the sensor measurements 212. For example, in some implementations, the prior event description 224 describes an event that caused the sensor measurements 212. In some implementations, the correlated event description 226 indicates an event that is correlated with the sensor measurements 212.

In various implementations, the executable instructions 230 include operations that the sensor 106 can perform. In some implementations, an executable instruction 230 includes a first instruction 230-1 to continue operating the sensor 106. In some implementations, an executable instruction 230 includes a second instruction 230-2 to expand the defined range 114 shown in FIG. 1, so that additional sensor measurements 112 fall within the defined range 114. In some implementations, an executable instruction 230 includes a third instruction 230-3 to reboot the sensor 106. In some implementations, an executable instruction 230 include a fourth instruction 230-4 to shut down the sensor 106. In various implementations, the data store 206 includes one or more look-up tables (LUTs), databases, and/or indices (e.g., inverted indices).

In various implementations, the search module 240 receives the search request 150, and provides the search results 250. In some implementations, the search results 250 include one or more executable instructions 230 from one of the records 208. In some implementations, the search module 240 retrieves the first feature vector 110 from the search request 150. If the search request 150 does not include the first feature vector 110, the search module 240 converts the first set of sensor measurements 112 into the first feature vector 110. Generally, the search module 240 determines the first feature vector 110 based on the search request 150 (e.g., based on the first set of sensor measurements 112).

In various implementations, the search module 240 identifies a second feature vector 210 that indicates a second set of sensor measurements 212 that are within a degree of similarity of the first set of sensor measurements 112. In some implementations, the search module 240 searches the data store 206 for a second feature vector 210 that is similar to the first feature vector 110. In some implementations, the search module 240 identifies the second feature vector 210 by querying the data store 206 with the first feature vector 110 or the first set of measurements 112. In response to querying the data store 206, the search module 240 receives a record identifier (ID) that identifies a particular record 208. The search module 240 retrieves the second feature vector 210 from the record 206 indicated by the record ID. In some implementations, the search module 240 identifies the second feature vector 210 based on multifactor analysis. In some implementations, the search module 240 identifies the second feature vector 210 based on a recursive autoencoder.

In various implementations, the search module 240 determines the search result 250 based on the second feature vector 210. For example, in some implementations, the search module 240 retrieves the executable instructions 230 from the record 208 corresponding with the second feature vector 210. In some implementations, the search module 240 retrieves the metadata 220 from the record 208 corresponding with the second feature vector 210.

In some implementations, if the search module 240 identifies multiple feature vectors 210 that are similar to the first feature vector 110, then the search module 240 selects the feature vector 210 that is most similar to the first feature vector 110. In some implementations, the search module 240 selects a finite number of feature vectors 210 that are similar to the first feature vector 110. For example, in some implementations, the search module 240 selects one-to-three feature vectors 210 that are most similar to the first feature vector 110. In some implementations, the search module 240 computes a relevance score for each feature vector 210 in the data store 206, and selects a finite number of feature vectors 210 based on the relevance score. For example, in some implementations, the search module 240 selects one-to-three feature vectors 210 with the highest relevance score.

In various implementations, the feedback module 242 updates the data store 206 based on the feedback data 246. In some implementations, the feedback module 242 receives the feedback data 246 from the sensor(s) 106 and/or the sensor gateway 120. In some implementations, the feedback module 242 receives the feedback data 246 in response to sending a feedback request 244. Alternatively, in some implementations, the feedback module 242 receives the feedback data 246 without explicitly sending the feedback request 244.

In some implementations, the feedback data 246 indicates whether the sensor 106 used any of the search results 250. In other words, in some implementations, the feedback data 246 indicates whether the sensor 106 executed any of the executable instructions 230 included in the search results 250. Put another way, in some implementations, the feedback data 246 indicates whether the sensor 106 performed any actions suggested by the search results 250. In some implementations, if the search results 250 include multiple executable instructions 230, the feedback data 246 indicates which of the executable instructions 230 were executed by the sensor 106.

In some implementations, the feedback data 246 indicates whether executing the executable instructions 230 indicated by the search results 250 prevents the sensor 106 from capturing subsequent sensor measurements 112 that are anomalous. In other words, in some implementations, the feedback data 246 indicates whether performing the actions suggested by the search results 250 prevents the sensor 106 from capturing subsequent sensor measurements 112 that are outside the defined range 114 shown in FIG. 1. In some implementations, the feedback module 242 sends the feedback request 244 after a predetermined amount of time from the time at which the search module 240 sent the search results 250. For example, in some implementations, the feedback module 242 sends the feedback request 244 twenty-four hours after the search results 250 were sent.

In various implementations, the feedback module 242 updates the data store 206 based on the feedback data 246. For example, in some implementations, each executable instruction 230 is associated with a counter that indicates the number of times that particular executable instruction 230 has been executed. In this example, the feedback module 242 increments the counter, if the feedback data 246 indicates that the particular executable instruction 230 was executed by the sensor 106. In some implementations, the search module 240 also includes the counter value for each executable instruction 230 in the search results 250. Accordingly, in some implementations, the sensor 106 determines to execute an executable instruction 230 based on the counter value. For example, in some implementations, a sensor 106 executes the executable instruction 230 with the highest counter value.

In some implementations, the feedback module 242 modifies the executable instructions 230 stored in a record 208 based on the feedback data 246. For example, in some implementations, the feedback module 242 removes a particular executable instruction 230 from the record 208, if the feedback data 246 repeatedly indicates that the particular executable instruction 230 is not helpful in avoiding anomalous sensor measurements 112. In some implementations, the feedback module 242 writes a new executable instruction 230 into the record 208, if the feedback data 246 indicates that the new executable instruction 230 was helpful in avoiding anomalous sensor measurements 112.

Figure 3:
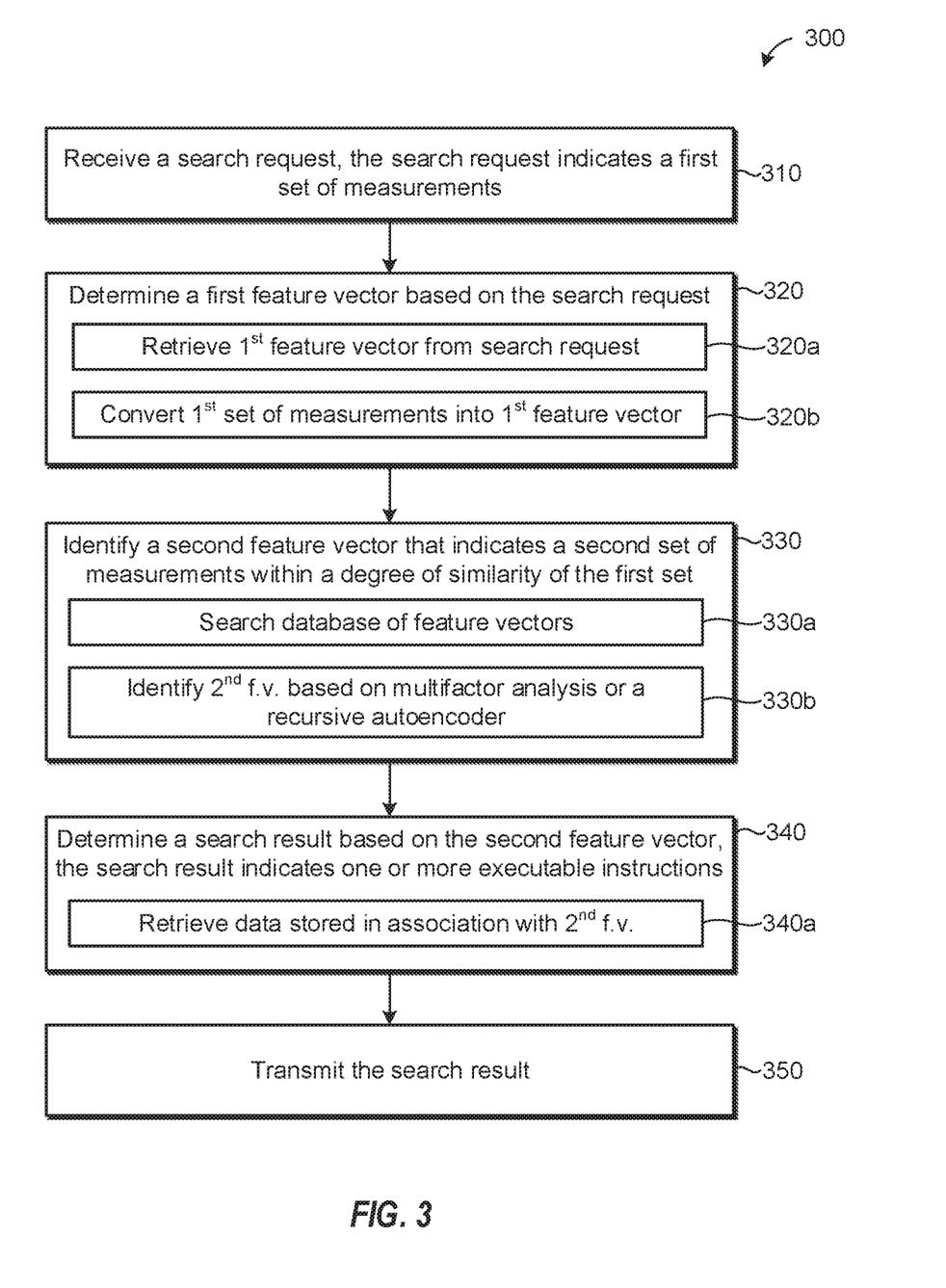
FIG. 3 is a flowchart representation of a method of providing search results to a sensor gateway in accordance with some implementations.

FIG. 3 is a flowchart representation of a method 300 of providing search results to a sensor and/or a sensor gateway (e.g., the sensors 106 and/or the sensor gateway 120 shown in FIGS. 1 and 2) according to some implementations. In various implementations, the method 300 is performed by a search module (e.g., the search module 240 shown in FIG. 2) included in and/or associated with a search engine (e.g., the search engine 200 shown in FIGS. 1 and 2). Briefly, the method 300 includes receiving a search request that indicates a first set of measurements, determining a first feature vector based on the search request, identifying a second feature vector that indicates a second set of measurements within a degree of similarity of the first set, determining a search result based on the second feature vector, and transmitting the search result.

To that end, as represented by block 310, in some implementations the method 300 includes receiving a search request from a sensor or a sensor gateway. In some implementations, the search request indicates a first set of measurements. The first set of measurements represent sensor measurements captured by the sensor. In some implementations, the search request includes a feature vector that includes the first set of measurements as its features.

As represented by block 320, in various implementations, the method 300 includes determining a first feature vector based on the search request. In some implementations, if the search request includes a feature vector, then determining the first feature vector includes retrieving the first feature vector from the search request (as represented by block 320a). In some implementations, if the search request does not include a feature vector, then determining the first feature vector includes converting the first set of measurements into the first feature vector (as represented by block 320b).

As represented by block 330, in various implementations, the method 300 includes identifying a second feature vector that indicates a second set of measurements within a degree of similarity of the first set of measurements. As represented by block 330a, in some implementations, the method 300 includes searching a feature vector data store that stores feature vector records corresponding with feature vectors. For example, as illustrated in FIG. 2, in some implementations, the method 300 includes searching the data store 206 that stores records 208 corresponding with feature vectors 210. Those of ordinary skill in the art will appreciate that there are numerous techniques for searching the database, and thus an exhaustive description of the various methods is not provided herein for the sake of brevity. As represented by block 330b, in some implementations, the method 300 includes identifying the second feature vector based on multifactor analysis or a recursive autoencoder. In various implementations, the first set of measurements and the second set of measurements are captured by different sensors. In some implementations, the first set of measurements are captured by a first sensor of a first type, and the second set of measurements are captured by a second sensor of a second type that is different from the first type.

As represented by block 340, in various implementations, the method 300 includes determining one or more search results based on the second feature vector. In some implementations, a search result indicates one or more executable instructions for the sensor in order to avoid capturing sensor measurements outside a defined range. In other words, in some implementations, a search result suggests one or more actions for a sensor to perform in order to avoid capturing anomalous sensor measurements. As represented by block 340*a*, in some implementations, determining the search result includes retrieving data stored in association with the second feature vector. For example, in some implementations, the method 300 includes retrieving the executable instructions from a feature vector record (e.g., the record 208 shown in FIG. 2) corresponding with the second feature vector. Additionally or alternatively, in some implementations, the method 300 includes retrieving metadata (e.g., the metadata 220 shown in FIG. 2) from the feature vector record, and including the metadata in the search result. For example, in some implementations, the method 300 includes incorporating the natural language string 222, the prior event description 224, and/or the correlated event description 226 (shown in FIG. 2) in the search result.

As represented by block 350, in various implementations, the method 300 includes transmitting the search result(s). In some implementations, the method 300 includes instantiating a data container (e.g., a JSON object), writing the search result(s) into the data container, and transmitting the data container. In some implementations, the method 300 includes transmitting the search result to the sensor gateway. Additionally or alternatively, the method 300 includes transmitting the search result to the sensor that captured the anomalous sensor measurements.

Figure 4:
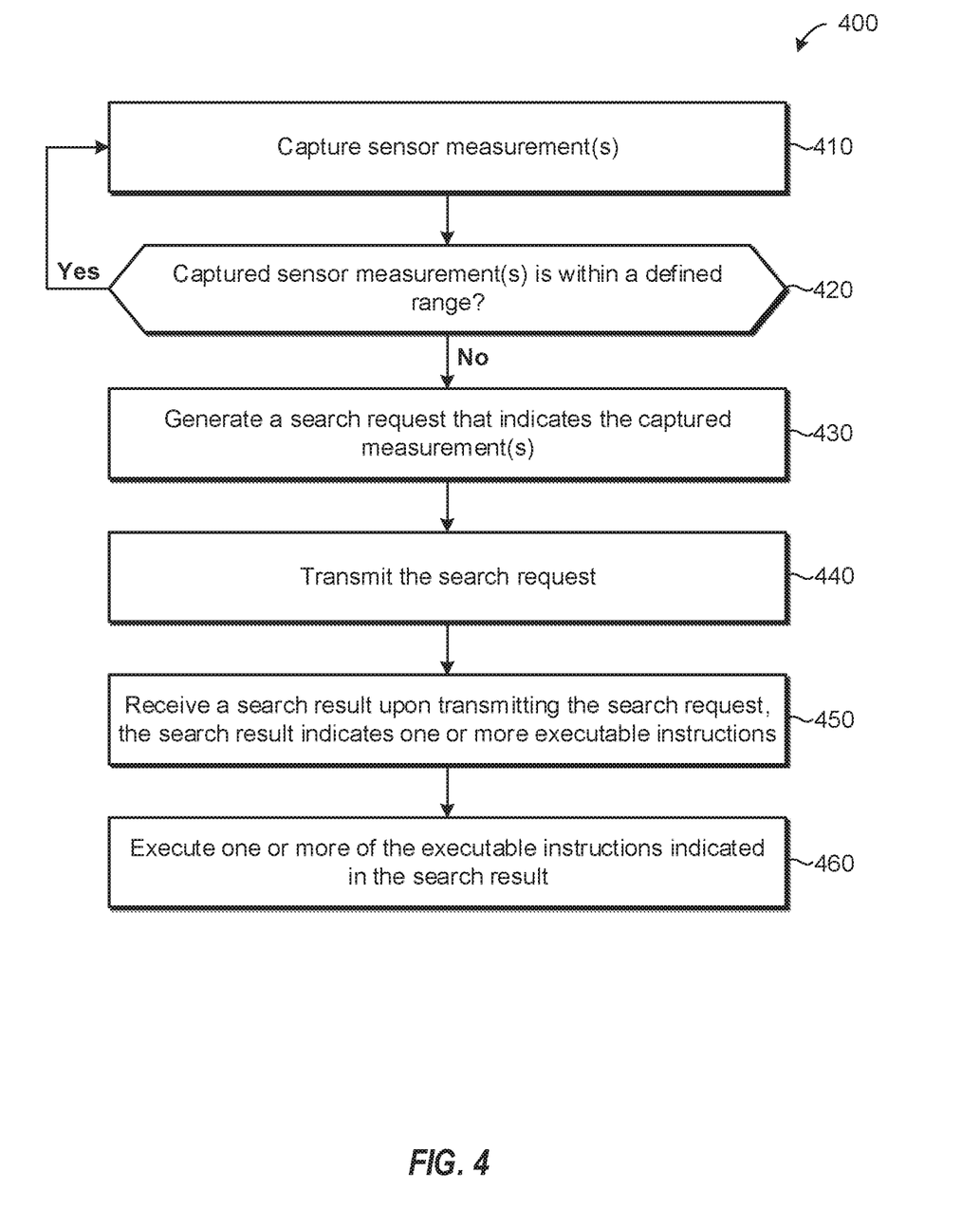
FIG. 4 is a flowchart representation of a method of requesting search results from a search engine in accordance with some implementations.

FIG. 4 is a flowchart representation of a method 400 of requesting search results from a search engine (e.g., the search engine 200 shown in FIGS. 1 and 2) according to some implementations. In various implementations, the method 400 is performed by a sensor and/or a sensor gateway (e.g., the sensor 106 and/or the sensor gateway 120 shown in FIG. 1). Briefly, the method 400 includes capturing a first set of sensor measurements, determining whether the first set of sensor measurements are within a defined range, generating a search request if one of the sensor measurements is outside the defined range, transmitting the search request, receiving a search result that indicates one or more executable instructions, and executing the one or more executable instructions.

To that end, as represented by block 410, in some implementations the method 400 includes capturing a sensor measurement (e.g., the sensor measurement 112 shown in FIGS. 1 and 2). In some implementations, the method 400 includes capturing the sensor measurement periodically (e.g., every few seconds, hours, or days). For example, in some implementations, an ambient temperature sensor (e.g., the ambient temperature sensor 106-1 shown in FIG. 1) captures an ambient temperature every 30 seconds. In some implementations, the method 400 includes capturing the sensor measurement upon detecting an event, or a condition. For example, in some implementations, a door/window sensor (e.g., the door/window sensor 106-3 shown in FIG. 1) captures a sensor measurement that indicates the open/close status of a door/window when the door/window is opened/closed.

As represented by block 420, in various implementations, the method 400 includes determining whether the captured sensor measurement is within a defined range. In some implementations, sensor measurements that are outside the defined range are considered anomalous, whereas sensor measurements that are inside the defined range are considered normal. Hence, in some implementations, the method 400 includes determining whether one of the captured sensor measurements is anomalous. In some implementations, if the captured sensor measurements are within the defined range, then the method 400 proceeds to block 410. Alternatively, in some implementations, if one of the captured sensor measurements is outside the defined range, then the method 400 proceeds to block 430.

As represented by block 430, in various implementations, the method 400 includes generating a search request. The search request indicates the captured sensor measurements including the sensor measurement that is outside the defined range. In other words, in some implementations, the search request includes a set of sensor measurements, and at least one of the sensor measurements in the set is outside the defined range. For example, in some implementations, the search request indicates the anomalous sensor measurement, and a finite number of sensor measurements that the sensor captured before and/or after capturing the anomalous sensor measurement. In some implementations, generating the search request includes instantiating a data container (e.g., a JSON object), and writing the sensor measurement to the data container. In some implementations, the method 400 includes converting the captured sensor measurement(s) into a feature vector, and including the feature vector in the search request. In such implementations, the feature vector includes the captured sensor measurement(s) as its features.

As represented by block 440, in various implementations, the method 400 includes transmitting the search request to a search engine (e.g., the search engine 200 shown in FIGS. 1 and 2). As represented by block 450, in various implementations, the method 400 includes receiving one or more search results from the search engine in response to transmitting the search request. In some implementations, a search result indicates one or more executable instructions for the sensor to execute in order to avoid capturing anomalous sensor measurements. In other words, in some implementations, a search result indicates one or more actions for the sensor to perform in order to avoid capturing anomalous sensor measurements.

As represented by block 460, in various implementations, the method 400 includes executing one or more of the executable instructions indicated by the search result(s). Put another way, in some implementations, the method 400 includes performing one or more actions suggested by the search result(s). In some implementations, the method 400 includes continuously operating the sensor (e.g., executing the first instruction 230-1 shown in FIG. 2). In some implementations, the method 400 includes expanding the defined range (e.g., executing the second instruction 230-2 shown in FIG. 2), so that the captured sensor measurement is not considered anomalous. In some implementations, the method 400 includes rebooting the sensor (e.g., executing the third instruction 230-3 shown in FIG. 2). In some implementations, the method 400 includes shutting down the sensor (e.g., executing the fourth instruction 230-4 shown in FIG. 2).

In some implementations, the search results suggest multiple actions for the sensor to perform. In such implementations, the method 400 includes determining which action to perform. In some implementations, each action is associated with a counter that indicates the number of times that action has been performed by other sensors. In such implementations, the method 400 includes identifying the action that is associated with the highest counter value, and performing that action. In some implementations, each action is associated with a percentage that indicates the likelihood of that action preventing anomalous sensor measurements. In such implementations, the method 400 includes identifying the action that is associated with the highest percentage, and performing that action.

Figure 5A:
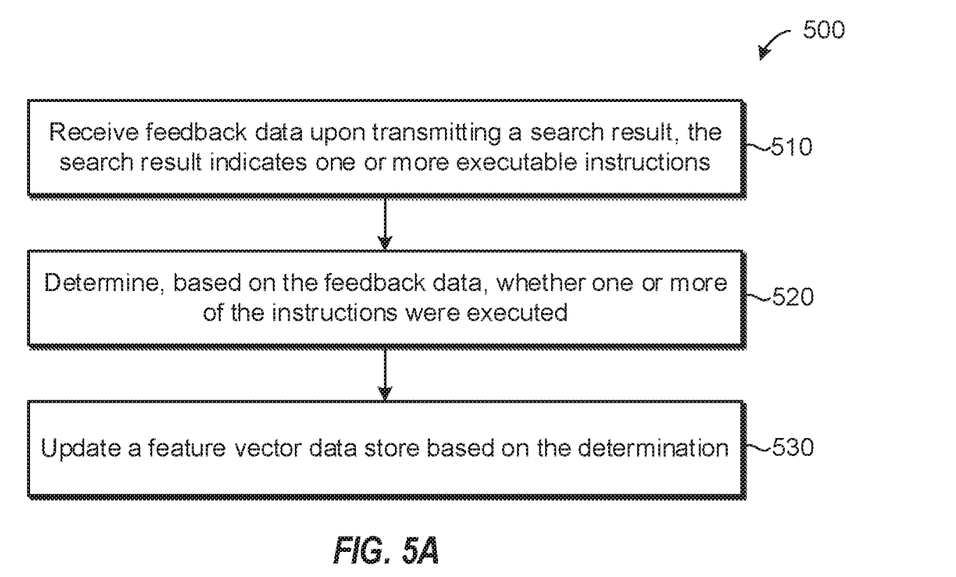
FIG. 5A is a flowchart representation of a method of updating a data store based on feedback data in accordance with some implementations.

FIG. 5A is a flowchart representation of a method 500 of updating a feature vector data store (e.g., the data store 206 shown in FIG. 2) based on feedback data (e.g., the feedback data 246 shown in FIG. 2) according to some implementations. In various implementations, the method 500 is performed by a feedback module (e.g., the feedback module 242 shown in FIG. 2) included in and/or associated with a search engine (e.g., the search engine 200 shown in FIGS. 1 and 2). Briefly, the method 500 includes receiving feedback data upon transmitting a search result that indicated one or more executable instructions, determining whether one of the executable instructions was executed, and updating the feature vector data store based on the determination.

To that end, as represented by block 510, in some implementations the method 500 includes receiving feedback data from a sensor and/or a sensor gateway (e.g., the sensor 106 and/or the sensor gateway 120 shown in FIGS. 1 and 2). In some implementations, the method 500 includes sending a feedback request to the sensor and/or the sensor gateway, and receiving the feedback data in response to sending the feedback request. Alternatively, in some implementations, the method 500 includes receiving the feedback data without sending an explicit feedback request. For example, in some implementations, sending the search results constitutes an implicit feedback request. In some implementations, the method 500 includes receiving the feedback data immediately upon transmitting the search results. Alternatively, in some implementations, the method 500 includes receiving the feedback data after a predetermined amount of time has passed from the time at which the search results were transmitted.

As represented by block 520, in various implementations, the method 500 includes determining, based on the feedback data, whether one or more of the executable instructions indicated by the search results were executed. In some implementations, the feedback data indicates which of the executable instructions were executed by the sensor and/or the sensor gateway. In other words, in some implementations, the feedback data indicates which of the actions suggested by the search results were performed by the sensor and/or the sensor gateway.

As represented by block 530, in various implementations, the method 500 includes updating a feature vector data store (e.g., the data store 206 shown in FIG. 2) based on the determination. In some implementations, the method 500 includes updating the feature vector data store, if the feedback data indicates that the sensor and/or the sensor gateway performed at least one of the actions suggested by the search results. In some implementations, updating the feature vector data store includes incrementing a counter associated with the action that the sensor and/or the sensor gateway performed. In some implementations, the counter associated with an action indicates the number of times the action has been performed. In some implementations, the search results also include a counter value associated with each suggested action. In such implementations, the sensor and/or the sensor gateway are able to select an action based on the number of times the action has been performed by other sensors in the past.

Figure 5B:
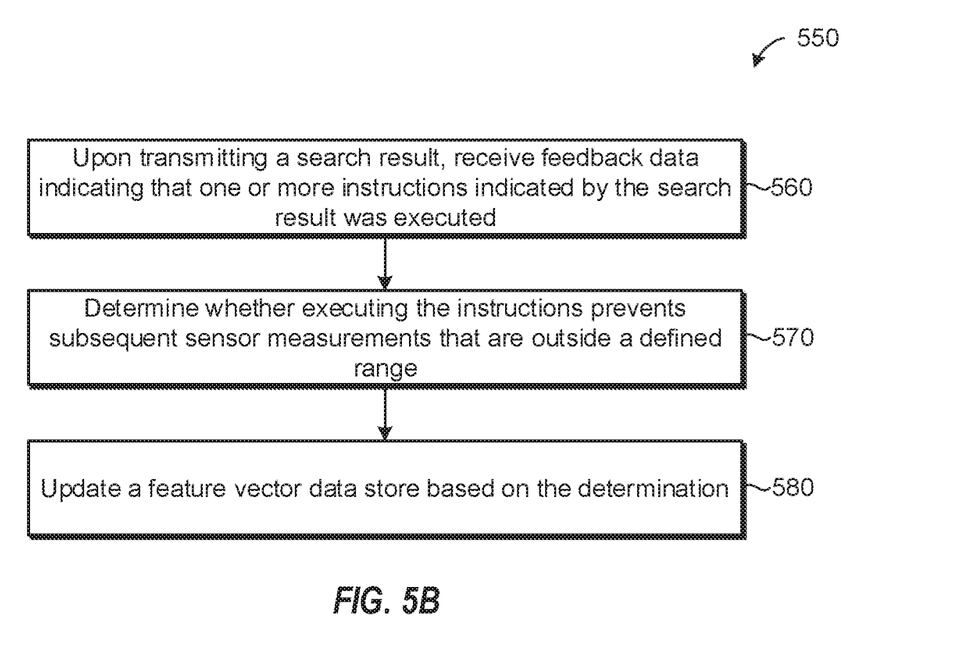
FIG. 5B is a flowchart representation of another method of updating the data store based on feedback data in accordance with some implementations.

FIG. 5B is a flowchart representation of a method 550 of updating a feature vector data store (e.g., the data store 206 shown in FIG. 2) based on feedback data (e.g., the feedback data 246 shown in FIG. 2) according to some implementations. In various implementations, the method 550 is performed by a feedback module (e.g., the feedback module 242 shown in FIG. 2) included in and/or associated with a search engine (e.g., the search engine 200 shown in FIGS. 1 and 2). Briefly, the method 550 includes receiving feedback data that indicates that one or more executable instructions suggested via the search results were executed by a sensor and/or a sensor gateway, determining whether executing the executable instructions prevents subsequent sensor measurements from being outside a defined range, and updating a feature vector data store based on the determination.

To that end, as represented by block 560, in some implementations the method 550 includes receiving feedback data that indicates that one or more executable instructions suggested via search results were executed by a sensor and/or a sensor gateway. In other words, in some implementations, the method 500 includes receiving feedback data that indicates that an action suggested by a search result has been performed by a sensor and/or a sensor gateway. In some implementations, receiving the feedback data includes sending a feedback request, and receiving the feedback data in response to sending the feedback request. In some implementations, the method 550 includes receiving feedback data whenever an action suggested by the search results is performed by the sensor and/or the sensor gateway.

As represented by block 570, in some implementations, the method 550 includes determining whether executing the executable instructions indicated by the search results prevents subsequent sensor measurements from being outside a defined range (e.g., the defined range 114 shown in FIG. 1). In other words, in some implementations, the method 550 includes determining whether the sensor and/or the sensor gateway avoided capturing anomalous sensor measurements after performing the action suggested via the search result. In some implementations, the feedback data indicates a time at which the sensor and/or the sensor gateway performed the action. In such implementations, if a difference between a current time and the time indicated by the feedback data is greater than a threshold time period, and the sensor has not captured any anomalous sensor measurements since performing the action, then the method 550 includes determining that the action prevented subsequent anomalous sensor measurements. In other words, the method 550 includes determining that the performed action was effective at avoiding subsequent anomalous sensor measurements, if no anomalous sensor measurements are captured for a threshold time period after the action was performed.

As represented by block 580, in some implementations, the method 550 includes updating a feature vector data store (e.g., the feature vector data store 206 shown in FIG. 2) based on determining whether the executed instruction prevented subsequent anomalous sensor measurements. In some implementations, if the feedback data repeatedly indicates that a particular action does not help in preventing anomalous sensor measurements, then the method 550 includes removing (e.g., purging) that action from the feature vector record. In some implementations, if the feedback data repeatedly indicates that a particular action helps in preventing anomalous sensor measurements, then the method 550 includes ranking that particular action higher than other actions that are not as helpful in preventing anomalous sensor measurements. In some implementations, if the feedback data indicates a new action that prevents anomalous sensor measurements, then the method 550 includes writing that new action into the appropriate feature vector record stored in the feature vector data store.

Figure 6:
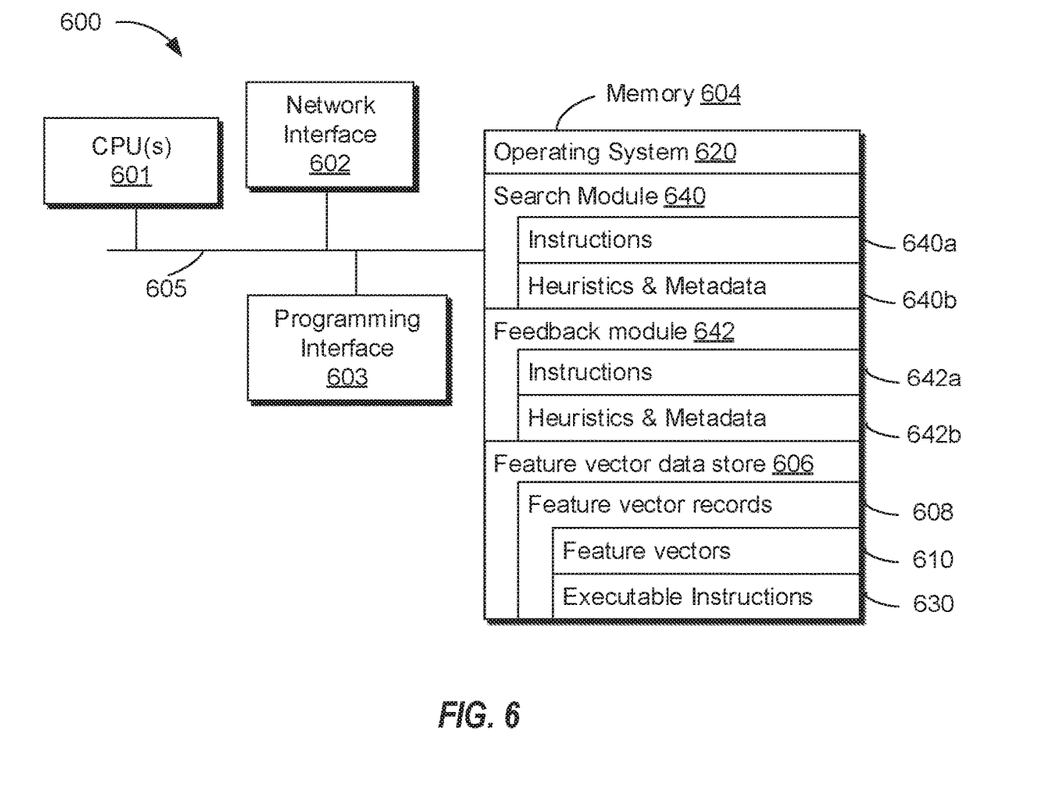
FIG. 6 is a block diagram of a server system enabled with various modules of a search engine in accordance with some implementations.

FIG. 6 is a block diagram of a server system 600 enabled with various modules of a search engine according to some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604 and one or more communication buses 605 for interconnecting these and various other components.

In some implementations, the memory 604 or the non-transitory computer readable storage medium of the memory 604 stores the following programs, modules and data structures, or a subset thereof including an optional operating system 620, a search module 640, a feedback module 642, and a feature vector data store 606. In various implementations, the search module 640, the feedback module 642 and the feature vector data store 606 are similar to the search module 240, the feedback module 242 and the feature vector data store 206, respectively shown in FIG. 2.

The operating system 620 includes procedures for handling various basic system services and for performing hardware dependent tasks.

In some implementations, the feature vector data store 606 stores feature vector records 608 that correspond with respective feature vectors 610. In some implementations, the feature vector records 608 are similar to the feature vector records 208 shown in FIG. 2. Similarly, in some implementations, the feature vectors 610 are similar to the feature vectors 210 shown in FIG. 2. In various implementations, each feature vector 610 includes a set of sensor measurement as its features. In some implementations, in addition to storing a feature vector 610, a feature vector record 608 also stores metadata (e.g., the metadata 220 shown in FIG. 2). In some implementations, the metadata includes a natural language string (e.g., the natural language string 222 shown in FIG. 2), a prior event description (e.g., the prior event description 224 shown in FIG. 2), and/or a correlated event description (e.g., the correlated event description 226 shown in FIG. 2). In some implementations, each feature vector record 608 includes one or more executable instructions 630 (e.g., the executable instructions 230 shown in FIG. 2). In some implementations, the executable instructions 630 are actions that a sensor and/or a sensor gateway can perform to avoid capturing anomalous sensor measurements.

In some implementations, the search module 640 is configured to provide search results in response to receiving a search request. For example, as illustrated in FIGS. 1 and 2, the search module 640 provides the search results 250 in response to receiving the search request 150. In various implementations, the search module 640 generates the search results by identifying a feature vector record 608 that is relevant to the search request, and retrieving the executable instructions 630 stored in the identified feature vector record 608. In some implementations, the search module 640 identifies the relevant feature vector record 608 by identifying a feature vector 610 that is within a degree of similarity to the feature vector included in the search request. In some implementations, the search module 640 performs the method 300 illustrated in FIG. 3. To that end, in various implementations, the search module 640 includes instructions and/or logic 640a, and heuristics and metadata 640b.

In some implementations, the feedback module 642 is configured to update the feature vector data store 606 based on feedback data. For example, as illustrated in FIG. 2, the feedback module 642 updates the feature vector data store 206 based on the feedback data 246 received from the sensor 106 and/or the sensor gateway 120. In some implementations, the feedback module 642 updates a counter associated with an executable instruction 630 to indicate the number of times the executable instruction 630 has previously been executed by a sensor and/or a sensor gateway. In some implementations, the feedback module 642 removes a particular executable instruction 630 from the feature vector record 608, if the feedback data repeatedly indicates that the particular executable instruction is not helpful in avoiding anomalous sensor measurements. In some implementations, the feedback module 642 writes a new executable instruction 630 into the feature vector record 608, if the feedback data indicates that the new executable instruction 630 has been helpful in avoiding anomalous sensor measurements. In some implementations, the feedback module 642 performs the method 500 illustrated in FIG. 5A, and/or the method 550 illustrated in FIG. 5B. To that end, in various implementations, the feedback module 642 includes instructions and/or logic 642a, and heuristics and metadata 642b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   receiving, by a search engine, a search request generated by a sensor gateway upon receiving a first set of measurements captured by a first sensor, wherein the search request comprises the first set of measurements captured by the first sensor, and a first measurement from the first set of measurements is outside a defined range;
   retrieving, by the search engine, a first feature vector from the search request generated by the sensor gateway;
   identifying, by the search engine, a second feature vector that indicates a second set of measurements within a degree of similarity to the first set of measurements, the second set of measurements being captured by a second sensor;
   retrieving, by the search engine, one or more instructions executable by the first sensor from a feature vector record in which the second feature vector is stored;
   generating, by the search engine based on the second feature vector, a search result that includes the one or more instructions executable by the first sensor; and
   transmitting, by the search engine, the search result to the first sensor via the sensor gateway to cause the first sensor to execute the one or more instructions, wherein the one or more instructions comprise shutting down the first sensor, rebooting the first sensor, or updating the defined range.

2. The method of claim 1, wherein retrieving the first feature vector comprises converting the first set of measurements into the first feature vector.

3. The method of claim 1, wherein identifying the second feature vector comprises searching a feature vector data store that stores feature vector records corresponding with feature vectors.

4. The method of claim 3, wherein identifying the second feature vector comprises identifying the second feature vector based on one or more of a multifactor analysis or a recursive autoencoder.

5. The method of claim 3, wherein generating the search result comprises:
   identifying, from the feature vector data store, the feature vector record that corresponds with the second feature vector.

6. The method of claim 3, further comprising:
   receiving feedback data indicating whether the first sensor executed the one or more instructions included in the search result; and
   updating the feature vector record corresponding with the second feature vector based on whether the first sensor executed the one or more instructions.

7. The method of claim 3, further comprising:
   receiving feedback data indicating that the one or more instructions, when executed by the first sensor, prevent the first sensor from capturing additional measurements that are outside the defined range; and
   updating the feature vector record corresponding with the second feature vector to indicate that the one or more instructions prevent the first sensor from obtaining additional measurements that are outside the defined range.

8. The method of claim 1, further comprising:
   determining the defined range; and
   transmitting data indicative of the defined range to the sensor gateway.

9. The method of claim 1, wherein the second feature vector is associated with a text string; and wherein determining the search result comprises including the text string in the search result.

10. A system comprising:
    a network interface configured to receive a search request generated by a sensor gateway, wherein the search request comprises a first set of measurements captured by a first sensor and sent to the sensor gateway upon receiving a first set of measurements captured by the first sensor, and a first measurement from the first set of measurements is outside a defined range; and
    a search module configured to:
       retrieve a first feature vector from the search request generated by the sensor gateway;
       identify a second feature vector that indicates a second set of measurements within a degree of similarity to the first set of measurements, the second set of measurements being captured by a second sensor;
       retrieve one or more instructions executable by the first sensor from a feature vector record in which the second feature vector is stored;
       generate, based on the second feature vector, a search result that includes the one or more instructions executable by the first sensor; and
       transmit the search result to the first sensor via the sensor gateway to cause the first sensor to execute the one or more instructions, wherein the one or more instructions comprise shutting down the first sensor, rebooting the first sensor, or updating the defined range,
    wherein the search module and network interface are implemented on a search engine.

11. The system of claim 10, wherein retrieving the first feature vector comprises converting the first set of measurements into the first feature vector.

12. The system of claim 10, wherein identifying the second feature vector comprises searching a feature vector data store that stores feature vector records corresponding with feature vectors.

13. The system of claim 12, wherein identifying the second feature vector comprises identifying the second feature vector based on one or more of a multifactor analysis or a recursive autoencoder.

14. The system of claim 12, wherein generating the search result comprises:
    identifying, from the feature vector data store, the feature vector record that corresponds with the second feature vector.

15. The system of claim 12, further comprising:
    a feedback module configured to:
    receive data indicating whether the first sensor executed the one or more instructions included in the search result; and
    update the feature vector record corresponding with the second feature vector based on whether the first sensor executed the one or more instructions.

16. The system of claim 12, further comprising:
    a feedback module configured to:

receive data indicating that the one or more instructions, when executed by the first sensor, prevent the first sensor from capturing additional measurements that are outside the defined range; and update the feature vector record corresponding with the second feature vector to indicate that the one or more instructions prevent the first sensor from obtaining additional measurements that are outside the defined range.

17. A device comprising:

a network interface configured to receive a search request generated by a sensor gateway, wherein the search request comprises a first set of measurements captured by a first sensor and sent to the sensor gateway upon receiving a first set of measurements captured by the first sensor, and a first measurement from the first set of measurements is outside a defined range;

a processor configured to execute computer readable instructions included on a non-transitory memory; and a non-transitory memory including computer readable instructions, that when executed by the processor, cause the device to:

retrieve a first feature vector from the search request generated by the sensor gateway;

identify a second feature vector that indicates a second set of measurements within a degree of similarity to the first set of measurements, the second set of measurements being captured by a second sensor;

retrieve one or more instructions executable by the first sensor from a feature vector record in which the second feature vector is stored;

generate, based on the second feature vector, a search result that includes the one or more instructions executable by the first sensor; and transmit the search result to the first sensor via the sensor gateway to cause the first sensor to execute the one or more instructions, wherein the one or more instructions comprise shutting down the first sensor, rebooting the first sensor, or updating the defined range, wherein the device is a search engine.

* * * * *